United States Patent [19]

Albertson

[11] 4,333,826
[45] Jun. 8, 1982

[54] SEDIMENT INDICATOR FOR LIQUID CIRCULATORY SYSTEM

[76] Inventor: Robert V. Albertson, 2100 Shadywood Rd., Wayzata, Minn. 55391

[21] Appl. No.: 215,393

[22] Filed: Dec. 11, 1980

Related U.S. Application Data

[63] Continuation-in-part of Ser. No. 34,267, Apr. 30, 1979, Pat. No. 4,271,016.

[51] Int. Cl.³ ............................................ B01D 21/00
[52] U.S. Cl. ...................................... 210/94; 210/167
[58] Field of Search ......................... 210/94, 95, 167; 237/8 A

[56] References Cited

U.S. PATENT DOCUMENTS

| | | | |
|---|---|---|---|
| 1,933,409 | 10/1933 | Berman | 210/94 |
| 2,389,817 | 11/1945 | Pond et al. | 210/94 |
| 2,708,596 | 5/1955 | Weller | 237/8 R |
| 3,188,004 | 6/1965 | Falk | 237/8 R |
| 3,360,128 | 12/1967 | Federline | 210/94 |
| 3,372,807 | 3/1968 | Barnard | 210/94 |

FOREIGN PATENT DOCUMENTS 160500  1/1955  Australia .............................. 210/94

Primary Examiner—John Adee
Attorney, Agent, or Firm—Burd, Bartz & Gutenkauf

[57] ABSTRACT

A sediment indicator for installation in a fluid flow line of a fluid circulatory system, such as a liquid cooling system for an internal combustion engine to provide a visual indication of when the fluid medium has become dirty and is in need of cleaning or replacement. The indicator includes the tubular open ended member insertable in a fluid flow line of the circulatory system to provide a fluid passage that is in fluid communication with the flow of fluid in a system. The indicator includes a housing portion having a sediment collecting chamber open to the flow passage of the tubular member and in depending relationship to it. The housing is at least partially transparent to permit visual inspection of the chamber. A washer having a hole smaller than the sediment collecting chamber restricts the rate of movement of sediment into the chamber. Sediment entrained in the circulating fluid medium as it passes in the fluid passage of the tubular member drops under the influence of gravity through the hole in the washer into the chamber where it can be viewed from without the housing. Collection of a predetermined amount of sediment in the chamber is indicative that fluid medium needs to be cleaned or replaced.

10 Claims, 15 Drawing Figures

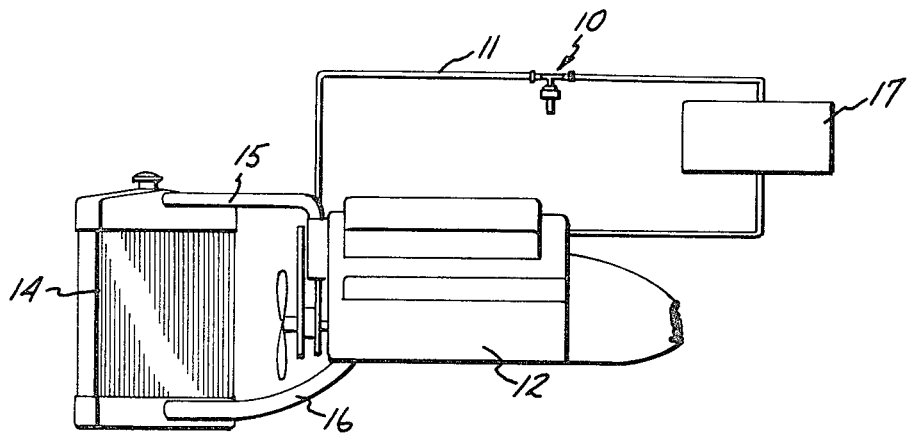
FIG.1
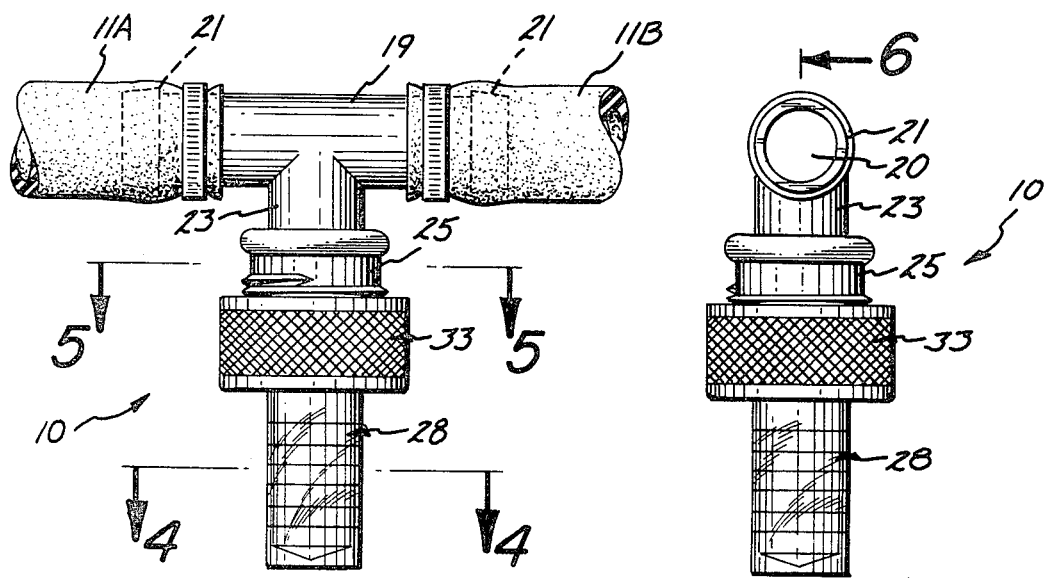
FIG.2
FIG.3
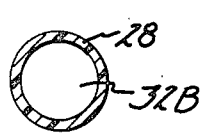
FIG.4
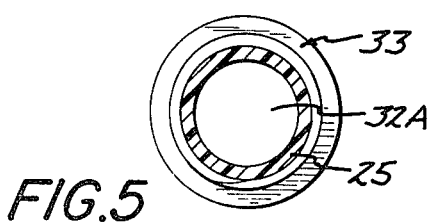
FIG.5

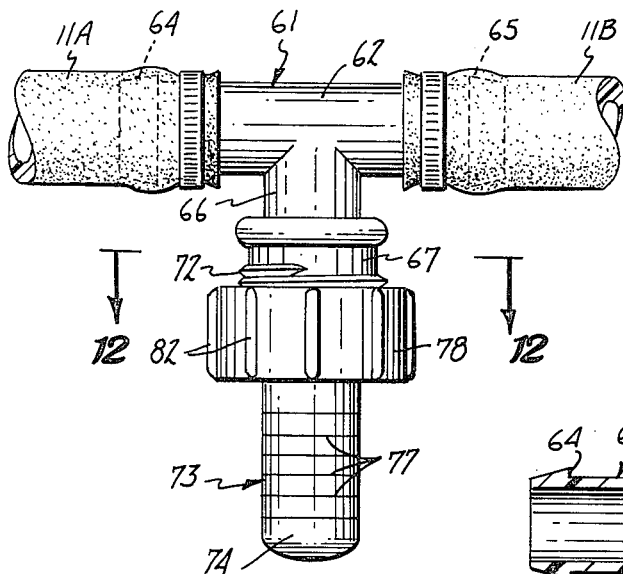
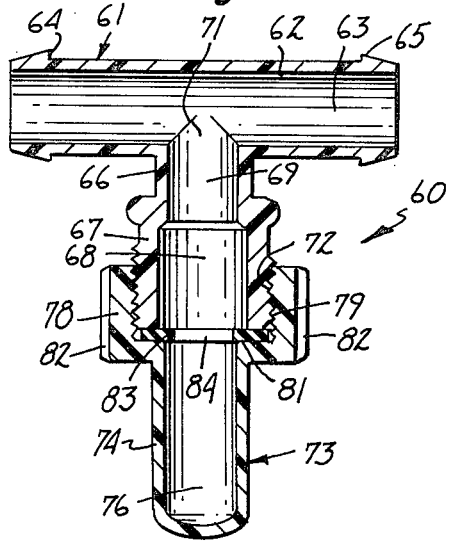
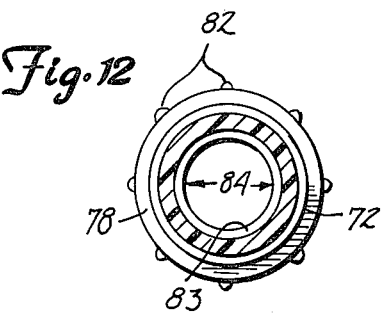
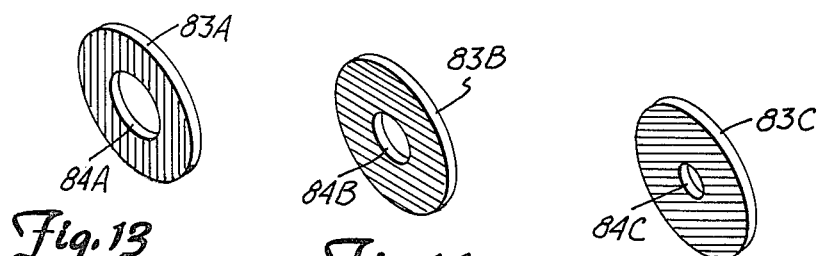

SEDIMENT INDICATOR FOR LIQUID CIRCULATORY SYSTEM

CROSS REFERENCE TO RELATED APPLICATION

This application is a continuation-in-part of U.S. application Ser. No. 034,267, filed Apr. 30, 1979, now U.S. Pat. No. 4,271,016, granted June 2, 1981.

SUMMARY OF INVENTION

In a fluid circulating system, such as the liquid cooling system of an internal combustion engine, the fluid medium requires periodic changing or cleaning, as it is prone to collect sediment, such as dirt and rust particles, as it circulates through the system. It is a conventional and necessary practice to clean and flush radiators, heater cores, and blocks of internal combustion engines to flush foreign matter and sediment, such as scale, sludge, dirt, and deposits, that accumulate therein. Current automobile engines are equipped with smaller capacity cooler systems to reduce weight. These cooling systems are operated under higher temperatures and pressure to increase cooling rate and efficiency. The systems must be periodically cleaned to insure sufficient heat transfer and liquid circulation. The usual method of attempting to determine when the fluid medium needs cleaning or replacement is simply to visually inspect the liquid by removal of the radiator cap and viewing the liquid contained therein. At best, this method gives only an approximation of when the fluid should be replaced or cleaned. Too frequent cleaning or replacement of the fluid is unnecessarily expensive, yet too infrequent cleaning or replacement can result in damage and malfunction.

The invention pertains to a sediment indicator to permit visual indication of when an amount of sediment has collected in the circulating fluid sufficient to warrant cleaning or replacement. The invention includes an open ended tubular member having an axial flow passage and being insertable in a fluid flow line of a circulating system. Fluid flowing in the circulating system flows through the axial passage of the tubular member in the normal course of circulation throughout the system. An indicator housing defines a sediment depository or chamber and is open to the tubular member. The housing is at least partially transparent to permit viewing of the chamber interior. Sediment entrained in the circulating fluid medium passes with the fluid through the fluid passage of the tubular members in the normal course of circulating through the system. As the sediment passes over the opening to the depository chamber, some of the sediment is drawn into the chamber under the influence of gravity. Over a period of time, the amount of sediment located in the chamber builds up and is observable from without the chamber. Collection of a predetermined amount of sediment in the chamber is indicative that the fluid medium is in need of cleaning or changing.

IN THE DRAWINGS

FIG. 1 is a side elevational view of an internal combustion engine system having a sediment indicator, according to a first form of the present invention, installed in a fluid flow line of the liquid coolant circulatory system;

FIG. 2 is an enlarged front elevational view of the sediment indicator shown in FIG. 1;

FIG. 3 is a side view of the sediment indicator shown in FIG. 2;

FIG. 4 is a sectional view of a portion of the sediment indicator of FIG. 3 taken along the line 4—4 thereof;

FIG. 5 is a sectional view of a portion of the sediment indicator of FIG. 2 taken along the line 5—5 thereof;

FIG. 10 is an enlarged front elevational view of a third form of the sediment indicator connected to a fluid flow line of a liquid coolant circulatory system;

FIG. 11 is a vertical sectional view of FIG. 10 similar to that shown in FIG. 7;

FIG. 12 is a sectional view taken along the line 12—12 of FIG. 10;

FIG. 13 is a perspective view of a sediment metering disc line to indicate the color red;

FIG. 14 is a perspective view of another modification of the sediment metering disc line to indicate the color blue; and FIG. 15 is a further modification of the sediment indicator disc line to indicate the color brown.

DESCRIPTION OF PREFERRED EMBODIMENTS

Figure 6:
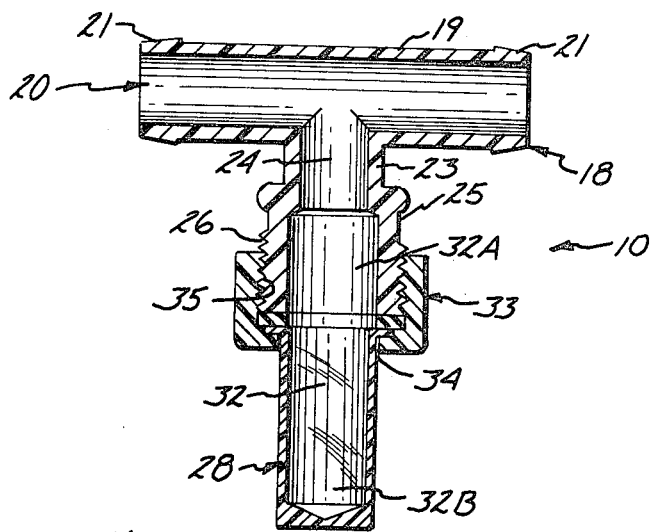
FIG. 6 is a sectional view of the sediment indicator, as shown in FIG. 3, taken along the line 6—6 thereof.

Referring to the drawings, there is shown in FIG. 1 a sediment indicator 10, according to a first form of the invention, installed in a fluid flow line 11 of a cooling fluid circulatory system of an internal combustion engine 12. Internal combustion engine 12 has a circulatory system, including the usual radiator 14 for storage and cooling of the liquid medium circulated through engine 12. Input and output hoses 15, 16 deliver coolant between the radiator 14 and the engine 12. Fluid flow line 11 is disposed between one end of the block of engine 12, passing through a heater core 17, and entering the opposite end of the block of engine 12. Coolant fluid circulates under pressure through radiator 14, hoses 15, 16, the block of engine 12, fluid flow line 11, and heater core 17. As it does, it accumulates sediment in the form of scale, sludge, dirt, and other deposits. For this reason, the coolant must periodically be cleaned or replaced. Sediment indicator 10 serves to provide a visual indication of when the coolant fluid should be cleaned or replaced.

Referring to FIGS. 2 through 6, sediment indicator 10 has a generally T-shaped member 18 with an elongate leg comprised as a transverse open ended tubular member 19, defining a fluid passage 20. As shown in FIG. 2, fluid flow line 11 is split, forming ends 11A and 11B which are snugly fitted over respective ends of tubular member 19. The respective ends of tubular member 19 have raised circumferential sloped ridges 21 which assist in maintaining the ends 11A, 11B of fluid flow line 11 in engagement with the respective ends of tubular member 19. Fluid passage 20 is thus disposed in the fluid flow path of fluid moving through the fluid flow line 11 in the path of normal fluid circulation through the system.

A second leg of T-shaped member 18 or neck 23 extends from tubular member 19 and has a connecting passage 24 open to the fluid passage 20 of tubular member 19. An enlarged head 25 extends from the neck 23 and carries external threads 26. A generally cylindrical housing 28 has a flanged lip 29 abutted against the outer edges of head 25. A resilient sealing washer 30 is disposed between the flange lip 29 of housing 28 and the outer edges of enlarged head 25. Enlarged head 25 and housing 28 have co-extensive openings or chambers 32A, 32B, which together form a sediment depository chamber 32 open to the fluid passage 20 by means of the connecting passage 24 in neck 23.

Sediment housing 28 is releasably secured with respect to the enlarged head 25 by a cap 33. Cap 33 has an opening 34 defined by an edge that permits passage of the body of housing 28, but intercepts the flanged lip 29. Cap 33 has interior threads 35 which are engageable with the exterior threads 26 on the enlarged head 25. With the cap 33 threaded onto the enlarged head 25, and engaged with the flange 29 of housing 28, housing 28 is firmly joined to the head 25 with a fluid seal provided by the washer 30. Chamber 32 is open only to the fluid passage 20 of tubular member 19.

At least a portion of the side wall of the housing 28 is transparent to permit viewing into the chamber 32. For example, housing 28 can be constructed of glass, plexiglas, or other clear plastic, as can be the tubular member 19, neck 23, and enlarged head 25. As shown in FIG. 1, sediment indicator 10 is installed with respect to fluid flow line 11, with the housing 32 in depending relationship from the flow of fluid as it moves through the fluid passage 20 of tubular member 19. As the fluid moves therethrough, a certain amount of sediment contained in the fluid drops into the chamber 32. This amount of sediment is observable from without the housing 28. When a predetermined amount of sediment has collected in the chamber 32, as viewed through the side wall of the housing 28, this is indicative that it is time to either replace or clean the circulating fluid. After this has been accomplished, the chamber 32 is emptied by disengagement of the cap 30 from enlarged head 25 whereupon the housing 28 can be cleaned along with the enlarged head 25, the neck 23, and the tubular member 19.

Figure 7:
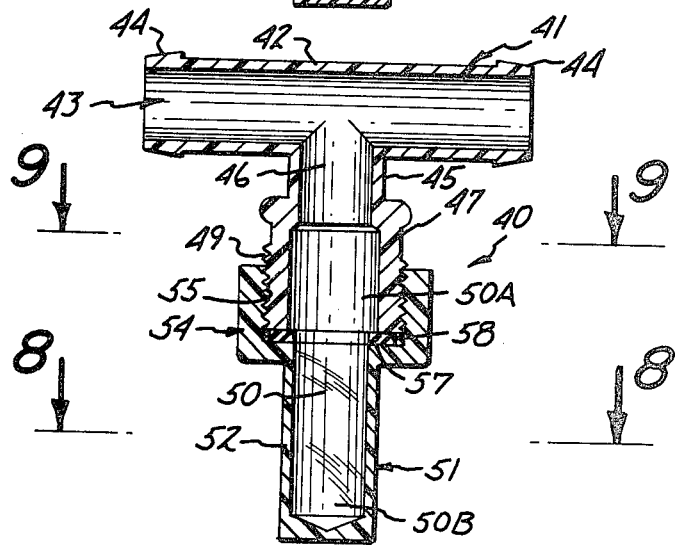
FIG. 7 is a sectional view of a sediment indicator similar to that shown in FIG. 6, showing a second form of the invention.
Figure 8:
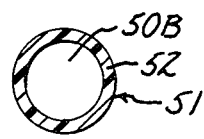
FIG. 8 is a sectional view of a portion of the sediment indicator of FIG. 7 taken along the line 8—8 thereof.
Figure 9:
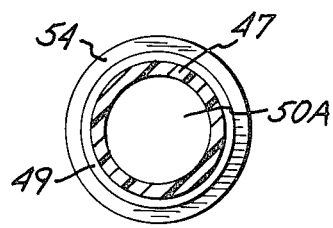
FIG. 9 is a sectional view of a portion of the sediment indicator of FIG. 7 taken along the line 9—9 thereof.

A first modified form of the sediment indicator of the invention is indicated generally at 40 in FIGS. 7 through 9. Sediment indicator 40 includes a T-shaped member 41 having an elongate tubular member 42 with a fluid flow passage 43. The respective ends of the tubular member 42 have raised circumferential sloped ridges 44 for engagement with split ends of a fluid flow line of a circulatory system. A neck 45 extends from the tubular member 42 and defines a connecting passage 46 open to the fluid flow passage 43. An enlarged head 47 extends from the neck 45 and carries exterior threads 49. Enlarged head 47 defines an interior chamber 50A which is connected to the connecting passage 46. A housing 52 is removably assembled to the T-member 41. Housing 51 includes a base portion 52 having a second chamber 50B co-extensive with the chamber 50A of the enlarged head 47 to form a sediment collecting chamber 50. The end of housing 51, assembled to the T-member 41, is provided with an integral enlarged cap or boss 54 having integral threads 55 which fit on the external threads 49 of enlarged head 47. Cap 54 is provided with a shoulder 57 which abuts the outer edge of enlarged head 47 when cap 54 is threaded thereon. A resilient washer 58 is disposed between the shoulder 57 and outer edge of the enlarged head 47 to provide a fluid tight seal.

At least a portion of the side wall of the housing 51 is transparent to permit viewing of the chamber 50 from without. As fluid flows through the flow passage 43 of T-member 41, some of the entrained sediment drops into the chamber 50. This can be viewed from time to time to determine the amount of sediment that has been deposited. A predetermined amount of sediment deposit is indicative that it is time to clean or change the circulating medium. After this has been accomplished, the housing 51 is removed from the T-member 41 for purposes of cleaning, and then replaced.

A second modified form of the sediment indicator of the invention is indicated generally at 60 in FIGS. 10 through 12. Sediment indicator 60 includes a T-connector or member 61 connected to adjacent ends 11A and 11B of a line or hose of a fluid flow circulatory system, such as the heater hose 11, as shown in FIG. 1. T-member 61 has a tubular member 62 having a longitudinal fluid flow passage 63. Flow passage 63 is in longitudinal alignment with the flow passages of the hose ends 11A and 11B. Passage 63 does not accommodate any obstructions or restrictions which interfere with the flow of fluid in the line ends 11A and 11B and the passage 63. The opposite ends of tubular member 62 have annular outwardly directed ridges 64 and 65, respectively. As shown in FIG. 10, the ridges 64 and 65 telescope into the hose ends 11A and 11B to seal the hose ends 11A and 11B onto the tubular member 62.

A tubular neck 66 is joined to the mid-section of tubular member 62 and extends downwardly therefrom. Neck 66 is integral with a cylindrical head 67 having a cylindrical chamber 68. Neck 66 has a passage 69 providing fluid communication between the passage 63 and chamber 68. Passage 69 has a diameter that is substantially the same as the diameter of the passage 63. An unobstructed inlet opening 71 provides free and unrestricted fluid communication between the passage 63 and passage 69. The diameter of chamber 68 is slightly larger than the diameter of passage 69.

The outer cylindrical surface of head 67 has screw threads 72 to accommodate a sediment indicator or siting unit indicated generally at 73. Indicator unit 73 has an elongated tubular body 74 having a cylindrical chamber 76 for accommodating sediment and foreign materials that settle out or separate from the liquid in the passage 63. As shown in FIG. 10, body 74 is provided with a plurality of longitudinally spaced site lines 77 which permit the user to have a visual indication of the amount of sediment accumulated in chamber 76.

Unit 73 has an enlarged cylindrical head 78 integrally joined to the top of tubular body 74. Head 78 has a plurality of internal threads 79 that cooperate with the threads 72 on head 67 to connect the indicator unit 73 to head 67. As shown in FIG. 11, when indicator unit 73 is mounted on head 67, the chamber 76 is in axial alignment with the head chamber 68. The indicator unit 73 has an annular internal shoulder 71 located adjacent the bottom or inner ends of the threads 79. Shoulder 81 is located in longitudinal alignment with the end of head 67.

A sediment metering disc 83 is interposed between shoulder 81 and the lower end of head 67. The disc 83 is made of a resilient material, such as rubber or plastic, and functions as a seal between shoulder 81 and the lower end of head 67 when the indicator unit is threaded into assembled relation with the head 67. The sediment metering disc 83 has a central hole 84 which controls the amount of sediment and foreign materials in the liquid in chamber 68, passage 69, and passage 63 that is allowed to settle into the settling chamber 76. Hole 84, as shown in FIG. 12, has a diameter that is smaller than the diameter of the settling chamber 76. The hole 84 functions as a restricting orifice which slows the accumulation of sediment in the sediment collecting chamber 76.

FIGS. 13, 14, and 15 show sediment metering discs 83A, 83B, and 83C, which are adapted to be interposed between the annular shoulder 81 and the end of head 67. Each of these discs have progressively smaller holes 84A, 84B, and 84C. The discs 83A, 83B, and 83C are color coded in accordance with the size of the holes 84A, 84B, and 84C. Disc 83A is red; disc 83B is blue; and disc 83C is brown. Other colors can be used to code the disc. Disc 83, as shown in FIG. 11, can also be color coded. The sediment metering discs enable the sediment indicator to be used with different types of liquid circulatory systems. In some systems, a substantial amount of sediment can be collected in a short period of time if there is no restriction of the amount of sediment that can be collected in the sediment chamber 76. The use of different sediment metering discs with the different holes will vary the time it takes to collect material in the sediment chamber 76.

In use, with a liquid cooling system of an internal combustion engine, each time the engine stops, the circulation of the liquid in the line 11 will stop. The foreign materials in the passage 63 will settle into the chamber 68, since it is located below passage 63. The material in chamber 68 will move through the holes 84 and accumulate in the settlement chamber 76.

When sediment metering discs 83B and 83C are used, the relatively small holes 84B and 84C will minimize the sucking or returning of the settled material in chamber 76 back into the main flow passage 63. The movement or flow of liquid in passage 63 causes a flow of liquid in the passage 69 and chamber 68. This agitates and picks up the settled material. Some of the settled material will move with the flowing liquid and return to the main passage 63. The sediment metering disc 83 serves as a partial barrier minimizing the flow of liquid in the sediment chamber 76.

The body 74 is made of transparent material, such as plastic or glass, to permit the visual inspection of the amount of sediment or material in chamber 76 without removing the indicator unit 73 from the T-member 61. The indicator unit is periodically inspected to determine the amount of material that has been settled in the chamber 76. After a period of time, the amount of material in chamber 76 increases and provides an indication that it is time to clean or change the circulating liquid in the system. After this has been accomplished, the body 74 is removed from the head 76 and cleaned. It is then replaced.

While there has been shown and described three forms of a sediment indicator, according to the invention, it will be apparent to those skilled in the art that deviations can be had from those forms shown without departing from the scope and spirit of the invention. The invention is defined in the following claims.

The embodiments of the invention in which an exclusive property or privilege is claimed are defined as follows:

1. A sediment indicator to provide visual indicia of the amount of sediment contained in the fluid medium of a fluid circulatory system having a fluid flow line, comprising: an open ended tubular member insertable in a fluid flow line of a fluid circulating system, said tubular member having an unobstructed fluid flow passage disposed in a normal circulatory flow path of fluid in the circulatory system when the tubular member is inserted in said fluid flow line, said unobstructed fluid flow passage having a diameter substantially the same as said fluid flow line so as to minimize disruption of normal fluid flow in the flow line, a neck extended normally from said tubular member, said neck terminating in a head having an outward edge surrounding an open end, said neck and head having an unobstructed passage open to said fluid flow passage and the open end of the head, a housing connected to the head and having a sediment depository chamber open to the fluid flow passage of the tubular member such that at least some sediment in fluid circulating through the fluid flow passage enters the sediment chamber; said housing having a side wall at least partially transparent to permit viewing into the sediment chamber from without the housing to determine the amount of sediment collected in the sediment chamber, said housing having a generally cylindrical body portion and a cap at one end, said head having exterior threads, said cap having an opening with interior threads threadably engaging the exterior threads on the head, said head and said housing having openings co-extensive to form a passage to said sediment chamber, said cap includes an interior shoulder which intercepts the outward edge of said head when threadably engaged with respect thereto, and a resilient washer disposed between the shoulder of the cap of the housing and the outward edge of the head to provide a fluid seal between the shoulder and outward edge, said washer having a single hole smaller than said openings in said head and housing to control the rate of collection of sediment in the sediment chamber.

2. The sediment indicator of claim 1 wherein: the fluid flow passage of the tubular member has substantially the same diameter as the passage in the neck and head.

3. The sediment indicator of claim 1 wherein: the cap and housing are a one-piece member.

4. A sediment indicator to provide an indication of the amount of sediment contained in the fluid medium of a fluid cooling system of an internal combustion engine having a hose for carrying fluid to a heater, comprising: an open ended tubular member insertable in the hose for carrying fluid to a heater, said tubular member having an unobstructed fluid flow passage disposed in a normal circulatory flow path of fluid in the hose when the tubular member is inserted in said hose; a neck extended from said tubular member, said neck terminating in a head having an outward edge surrounding an open end, said neck and head having an unobstructed passage open to said fluid flow passage and the open end of the head, a housing connected to the head, said housing having a sediment depository chamber open to the passage of the neck and head such that at least some sediment in fluid circulating through the fluid flow passage enters the chamber; said housing having means to provide an indication of the amount of sediment collected in the chamber, and washer means engageable with the head and housing to provide a fluid seal between the head and housing, said washer means having a single hole to control the rate of collection of sediment in the sediment chamber.

5. The sediment indicator of claim 4 wherein: said housing has a cap threaded onto the head to releasably secure the housing to the head, said washer means being located between said cap and head.

6. The sediment indicator of claim 5 wherein: said housing has a generally cylindrical body having an outwardly extended flange at one end in abutting relationship with said washer means, said cap having an opening with edges that permit passage of the body of said housing, but intercept said flange and maintain it in abutting relationship with said washer means when the cap is mounted on the head.

7. The sediment indicator of claim 4 wherein: the means to provide an indication of the amount of sediment collected in the chamber includes a side wall having at least one transparent portion to permit visual inspection of the amount of sediment collected in the chamber.

8. The sediment indicator of claim 4 wherein: said head has exterior threads, said housing including a cap having an opening with interior threads threadably engaging the exterior threads on the head, said cap includes an interior shoulder which intercepts the outward edge of said head when threadably engaged with respect thereto, and said washer means comprising a resilient washer disposed between the shoulder of the cap of the housing and the outward edge of the head to provide a fluid seal, said washer having a single hole smaller than said openings in the head and housing.

9. The sediment indicator of claim 8 wherein: said washer means is a resilient washer disposed between the outwardly extended flange on said housing and said head to provide a fluid seal.

10. The sediment indicator of claim 8 wherein: the cap and housing are a one-piece member.

* * * * *